United States Patent
Fei et al.

(10) Patent No.: US 11,203,135 B2
(45) Date of Patent: *Dec. 21, 2021

(54) MANUFACTURE OF INFLATABLE MEMBRANES

(71) Applicant: Lantos Technologies, Inc., Woburn, MA (US)

(72) Inventors: Robert J. Fei, Newton, MA (US); Michael L. Rishton, Reading, MA (US); Jonathan Aguilar, Haverhill, MA (US); Lydia Gregoret, Concord, MA (US)

(73) Assignee: Lantos Technologies, Inc., Derry, NH (US)

( * ) Notice: Subject to any disclaimer, the term of this patent is extended or adjusted under 35 U.S.C. 154(b) by 424 days.

This patent is subject to a terminal disclaimer.

(21) Appl. No.: 16/032,614

(22) Filed: Jul. 11, 2018

(65) Prior Publication Data

US 2018/0319047 A1 Nov. 8, 2018

Related U.S. Application Data

(63) Continuation of application No. 15/845,172, filed on Dec. 18, 2017.
(Continued)

(51) Int. Cl.
*B29C 41/22* (2006.01)
*B29C 41/14* (2006.01)
*B29L 22/02* (2006.01)

(52) U.S. Cl.
CPC .............. *B29C 41/22* (2013.01); *B29C 41/14* (2013.01); *B29L 2022/02* (2013.01);
(Continued)

(58) Field of Classification Search
None
See application file for complete search history.

(56) References Cited

U.S. PATENT DOCUMENTS 3,790,653 A 2/1974 Barkey et al.
4,643,733 A 2/1987 Becker
(Continued)

FOREIGN PATENT DOCUMENTS

CA 2840602 A1 1/2013
CN 102177733 A 9/2011
(Continued)

OTHER PUBLICATIONS

WelchAllyn CompacVideo Otoscope Model 23120 (NTSC) and 23120P (PAL), Operating Instruction Manual, 2000, 16 pages.
(Continued)

*Primary Examiner* — Matthew J Daniels
*Assistant Examiner* — Mohammad M Ameen
(74) *Attorney, Agent, or Firm* — GTC Law Group PC & Affiliates

(57) ABSTRACT

A method includes applying a transferrable material to an outer surface of a casting plate to form a pattern on the outer surface of the casting plate. After applying of the transferrable material, a composite material is applied to the outer surface of the casting plate to form an inflatable membrane. The composite material covers at least a portion of the pattern and includes a florescent material and a pigment material. The inflatable membrane is cured to allow removal of the inflatable membrane from the casting plate. The inflatable membrane has an inner surface having the pattern detectable upon receiving of light causing the fluorescing material to emit florescent light.

8 Claims, 10 Drawing Sheets

Related U.S. Application Data

(60) Provisional application No. 62/436,340, filed on Dec. 19, 2016.

(52) U.S. Cl.
CPC ... *B32B 2250/03* (2013.01); *B32B 2307/4026* (2013.01); *B32B 2307/41* (2013.01); *B32B 2307/422* (2013.01)

(56) References Cited

U.S. PATENT DOCUMENTS

| | | | |
|---|---|---|---|
| 5,100,587 | A | 3/1992 | Clough et al. |
| 5,504,316 | A | 4/1996 | Bridgelall et al. |
| 5,829,350 | A * | 11/1998 | Muchi ............... B41F 17/001 101/35 |
| 6,001,059 | A | 12/1999 | Elliott |
| 7,625,335 | B2 | 12/2009 | Deichmann et al. |
| 8,032,337 | B2 | 10/2011 | Deichmann et al. |
| 8,047,207 | B2 | 11/2011 | Perez et al. |
| 8,107,086 | B2 | 1/2012 | Marini et al. |
| 8,384,916 | B2 | 2/2013 | Hart et al. |
| 8,840,566 | B2 | 9/2014 | Seibel et al. |
| 8,845,526 | B2 | 9/2014 | Hart et al. |
| 9,291,565 | B2 | 3/2016 | Hart et al. |
| 9,592,100 | B2 | 3/2017 | Olson et al. |
| 10,122,989 | B2 | 11/2018 | Fei et al. |
| 10,616,560 | B2 | 4/2020 | Fei et al. |
| 10,869,597 | B2 | 12/2020 | Patterson et al. |
| 10,925,493 | B2 | 2/2021 | Forsyth et al. |
| 2003/0164952 | A1 | 9/2003 | Deichmann et al. |
| 2004/0107080 | A1 | 6/2004 | Deichmann et al. |
| 2005/0191451 | A1 | 9/2005 | Osika et al. |
| 2007/0106012 | A1 | 5/2007 | Matyjaszewski et al. |
| 2008/0027358 | A1 | 1/2008 | Gregersen et al. |
| 2008/0058629 | A1 | 3/2008 | Seibel et al. |
| 2008/0234532 | A1 * | 9/2008 | De Langen ............ A61B 90/39 600/8 |
| 2009/0171196 | A1 | 7/2009 | Hauck et al. |
| 2009/0245530 | A1 | 10/2009 | Keady |
| 2009/0289938 | A1 | 11/2009 | Paulsen |
| 2009/0296980 | A1 | 12/2009 | Yi |
| 2010/0019170 | A1 | 1/2010 | Hart et al. |
| 2010/0039534 | A1 | 2/2010 | Hart et al. |
| 2010/0042002 | A1 | 2/2010 | Hart et al. |
| 2010/0168562 | A1 | 7/2010 | Zhao et al. |
| 2010/0296664 | A1 | 11/2010 | Burgett et al. |
| 2011/0009702 | A1 | 1/2011 | Morishita et al. |
| 2011/0076608 | A1 | 3/2011 | Bergemann et al. |
| 2011/0144480 | A1 | 6/2011 | Lu et al. |
| 2011/0235843 | A1 | 9/2011 | Keady et al. |
| 2011/0290005 | A1 | 12/2011 | Hart et al. |
| 2012/0197093 | A1 | 8/2012 | Leboeuf et al. |
| 2012/0327426 | A1 | 12/2012 | Hart et al. |
| 2013/0002426 | A1 | 1/2013 | Hart et al. |
| 2013/0002824 | A1 * | 1/2013 | Hart ..................... A61B 1/227 348/46 |
| 2013/0027516 | A1 | 1/2013 | Hart et al. |
| 2013/0078555 | A1 | 3/2013 | Orihara et al. |
| 2013/0261655 | A1 | 10/2013 | Drasler et al. |
| 2014/0272221 | A1 * | 9/2014 | Forsyth ............... A61B 5/6817 428/35.5 |
| 2014/0275974 | A1 | 9/2014 | Samuels |
| 2014/0276005 | A1 * | 9/2014 | Forsyth ............... A61B 5/0084 600/424 |
| 2014/0276105 | A1 | 9/2014 | De Brouchoven et al. |
| 2014/0330133 | A1 | 11/2014 | Stern |
| 2015/0017779 | A1 | 1/2015 | Kim |
| 2015/0036146 | A1 | 2/2015 | Staloff |
| 2016/0150949 | A1 | 6/2016 | Patterson et al. |
| 2017/0104977 | A1 | 4/2017 | Fei et al. |
| 2018/0178419 | A1 | 6/2018 | Fei et al. |
| 2019/0014309 | A1 | 1/2019 | Fei et al. |
| 2020/0236341 | A1 | 7/2020 | Fei et al. |

FOREIGN PATENT DOCUMENTS

| | | |
|---|---|---|
| CN | 103974183 A | 8/2014 |
| CN | 104333826 A | 2/2015 |
| CN | 104796806 A | 7/2015 |
| CN | 104936054 A | 9/2015 |
| JP | H08243262 A | 9/1996 |
| WO | 2012115863 A2 | 8/2012 |
| WO | 2013002935 A1 | 1/2013 |
| WO | 2013003416 A2 | 1/2013 |
| WO | 2014145026 A2 | 9/2014 |
| WO | 2014145058 A1 | 9/2014 |
| WO | 2014145077 A1 | 9/2014 |
| WO | 2015017779 A1 | 2/2015 |
| WO | 2016086005 A1 | 6/2016 |
| WO | 2017062868 A1 | 4/2017 |
| WO | 2017062868 A8 | 4/2017 |
| WO | 2018118772 A1 | 6/2018 |

OTHER PUBLICATIONS

"International Search Report and Written Opinion dated Sep. 11, 2014 for PCT application No. PCT/US2014/029662", 6 pages.
"International Search Report and Written Opinion dated Jul. 31, 2014 for PCT application No. PCT/US2014/029712", 6 pages.
"International Search Report and Written Opinion dated Aug. 7, 2014 for PCT application No. PCT/US2014/029738", 6 pages.
Park, "3D scan designs headphones just for you", [retrieved Dec. 19, 2016], http://www.unitedsciences.com/151-2, Jan. 10, 2015, 2 pages.
PCT/US15/62464, "International Application Serial No. PCT/US15/62464, International Preliminary Report on Patentability, dated May 30, 2017", Lantos Technologies Inc., 5 pages.
PCT/US15/62464, "International Application Serial No. PCT/US15/62464, International Search Report and Written Opinion dated Mar. 31, 2016", Lantos Technologies Inc., 7 pages.
PCT/US16/56132, "International Application Serial No. PCT/US16/56132, International Preliminary Report on Patentability and Written Opinion dated Apr. 19, 2018", Lantos Technologies Inc., 7 Pages.
PCT/US16/56132, "International Application Serial No. PCT/US16/56132, International Search Report and Written Opinion dated Jan. 26, 2017", Lantos Technologies, Inc., 8 pages.
PCT/US2014/029662, "International Application Serial No. PCT/US2014/029662, International Preliminary Report on Patentability dated Sep. 24, 2015", 5 pages.
PCT/US2014/029712, "International Application Serial No. PCT/US2014/029712, International Preliminary Report on Patentability dated Sep. 24, 2015", 5 pages.
PCT/US2014/029738, "International Application Serial No. PCT/US2014/029738 International Preliminary Report on Patentability dated Sep. 24, 2015", 5 pages.
PCT/US17/67010, "International Application Serial No. PCT/US17/67010, International Search Report and the Written Opinion dated Mar. 9, 2018.", Lantos Technologies Inc., 11 pages.
16854493.0, "European Application Serial No. 16854493.0, Extended European Search Report dated May 17, 2019", Lantos Technologies, Inc., 10 pages.
17885270.3, "European Application Serial No. 17885270.3, Extended European Search Report dated May 19, 2020", Lantos Technologies, Inc., 8 pages.
PCT/US17/67010, "International Application Serial No. PCT/US17/67010, International Preliminary Report on Patentability dated Jul. 4, 2019", Lantos Technologies, Inc., 8 pages.
U.S. Appl. No. 16/132,055, filed Sep. 14, 2018, Pending, Robert J. Fei.

* cited by examiner

MANUFACTURE OF INFLATABLE MEMBRANES

CROSS-REFERENCE TO RELATED APPLICATIONS

This application is a continuation of U.S. patent application Ser. No. 15/845,172, filed Dec. 18, 2017, and entitled "MANUFACTURE OF INFLATABLE MEMBRANES".

U.S. application Ser. No. 15/845,172 claims the benefit of priority to U.S. Provisional Patent Application Ser. No. 62/436,340, filed Dec. 19, 2016, and entitled "MANUFACTURE OF INFLATABLE MEMBRANES".

Each of the foregoing applications is incorporated herein by reference in its entirety.

TECHNICAL FIELD

The subject matter described herein relates to systems, methods, and computer programs for the manufacturing of inflatable membranes.

SUMMARY

In one aspect, a method can include applying a transferrable material to an outer surface of a casting plate to form a pattern on the outer surface of the casting plate. After applying of the transferrable material, a composite material is applied to the outer surface of the casting plate to form an inflatable membrane. The composite material covers at least a portion of the pattern and includes a florescent material and a pigment material. The inflatable membrane is cured to allow removal of the inflatable membrane from the casting plate. The inflatable membrane has an inner surface having the pattern detectable upon receiving of light causing the fluorescing material to emit florescent light.

In some variations one or more of the features disclosed herein including the following features can optionally be included in any feasible combination. The transferrable material may be applied by a hypodermic needle, painting with a brush, spraying, printing from a laser jet printer, printing from a pad printer, and/or etching and dipping. The composite material may be applied by dipping the casting plate with the transferrable material into the composite material.

In another aspect the method may include applying a first layer of a fiducial material to an outer surface of a casting plate, the fiducial material comprising fiducial markers suspended in the fiducial material; applying a second layer of a composite material to the first layer to form an inflatable membrane, the composite material comprising a florescent material and a pigment material; and curing the inflatable membrane to allow removal of the inflatable membrane from the casting plate, the inflatable membrane comprising an inner surface having the fiducial markers detectable upon receiving of light causing the fluorescing material to emit florescent light.

In some variations one or more of the features disclosed herein including the following features can optionally be included in any feasible combination. The method of claim 4, wherein the fiducial markers have a particle size of 50 microns to 400 microns. The first layer may be a clear layer without pigment material and the florescent material. The second layer ma include the fluorescent material but not the pigment material. The third layer may include the pigment material but not the fluorescent material. The pigment material may be selected to vary the optical and/or mechanical properties of the membrane. The first layer, the second layer, and the third layer may be applied by dipping the casting plate into the fiducial material, the composite material, or the pigment material. An aperture may be formed in a distal end of the inflatable membrane. A transparent material may be applied to span the aperture to form a window in the distal end of the inflatable membrane. The method may involve selectively applying the first layer and the second layer to the outer surface of the casting plate, without applying the first layer and the second layer to the distal end of the casting plate, to form the aperture in the distal end.

In an interrelated aspect, an apparatus includes an inflatable membrane having a pattern layer, a fluorescent layer, and a window. The pattern layer has an inner surface and an outer surface. The pattern layer has a pattern on the inner surface of the pattern layer and at least a portion of the pattern layer formed by a casting plate configured to create the fiducial markers. The fluorescent layer has an inner surface and an outer surface. The inner surface of the fluorescent layer abuts the outer surface of the pattern layer and includes a fluorescent material which, upon receiving of light, causes the florescent material to emit fluorescent light and causing the pattern to be detectable by a detector. The window includes a transparent material that spans an aperture formed in a distal end of the inflatable membrane.

In some variations one or more of the features disclosed herein including the following features can optionally be included in any feasible combination. The fluorescent layer may include a pigment material. The pattern may include a grid formed by the transferrable material and the pattern may include spots formed by the transferrable material. The inflatable membrane may include a pigmented layer having an inner surface and an outer surface. The inner surface of the pigmented layer may abut the outer surface of the fluorescent layer and comprising a pigment material. The fluorescent layer may include a matrix material that includes the fluorescent material and the pigment material. The fluorescent material may be a fluorescent dye and the pigment material is a carbon black. The inflatable membrane may be conical in shape such that the inflatable membrane is insertable into the ear of a person. The inflatable membrane may also include an aperture formed in a distal end of the inflatable membrane. The window can include a transparent material spanning the aperture to allow light to pass through the distal end.

In an interrelated aspect, an inflatable membrane includes a pattern layer, a fluorescent layer, and a window. The pattern layer has an inner surface and an outer surface. The pattern layer has a random pattern formed by fiducial markers suspended in a transparent matrix material integrated with the pattern layer and at least a portion of the pattern layer formed by, for example, a casting plate configured to create the fiducial markers. The fluorescent layer has an inner surface and an outer surface. The inner surface of the fluorescent layer abuts the outer surface of the pattern layer and includes a fluorescent material which, upon receiving of light with wavelengths in the excitation wavelength, causes the florescent material to emit fluorescent light of a different wavelength and causing the pattern to be detectable by a detector. The window includes a transparent material spans an aperture formed in a distal end of the inflatable membrane.

Implementations of the current subject matter can include, but are not limited to, systems, apparatuses, and methods consistent with the descriptions provided herein as well as articles that comprise a tangibly embodied machine-readable medium operable to cause one or more machines (e.g., computers, etc.) to result in operations implementing one or more of the described features. Similarly, computer systems are also contemplated that may include one or more processors and one or more memories coupled to the one or more processors. A memory, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system or across multiple computing systems. Such multiple computing systems can be connected and can exchange data and/or commands or other instructions or the like via one or more connections, including but not limited to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In certain industrial processes, an interior surface of an object or cavity may be scanned by imaging a pattern of light emitted or reflected from the interior surface. Based on the contours or three-dimensional shape of the interior surface, the received pattern of light may be interpreted to reconstruct the shape of the interior surface. To provide a surface with analyzable surface features, a deformable membrane may be applied to the interior surface to closely approximate the shape of the interior surface. The deformable membrane may include a particular pattern or other features that may facilitate reconstruction of the three-dimensional shape of the interior surface.

In some implementations, the deformable membrane may be applied to, for example a cavity, by inflating the deformable membrane until the deformable membrane closely conforms to at least a portion of the interior surface of the cavity, such as an ear or other cavity. Other methods of applying the deformable membrane may be implemented, for example, spraying, pouring, pressing, molding, or the like, of the deformable membrane. However, as used herein, and without implying any lack of generality, the deformable membrane will be referred to as an inflatable membrane.

Figure 1:
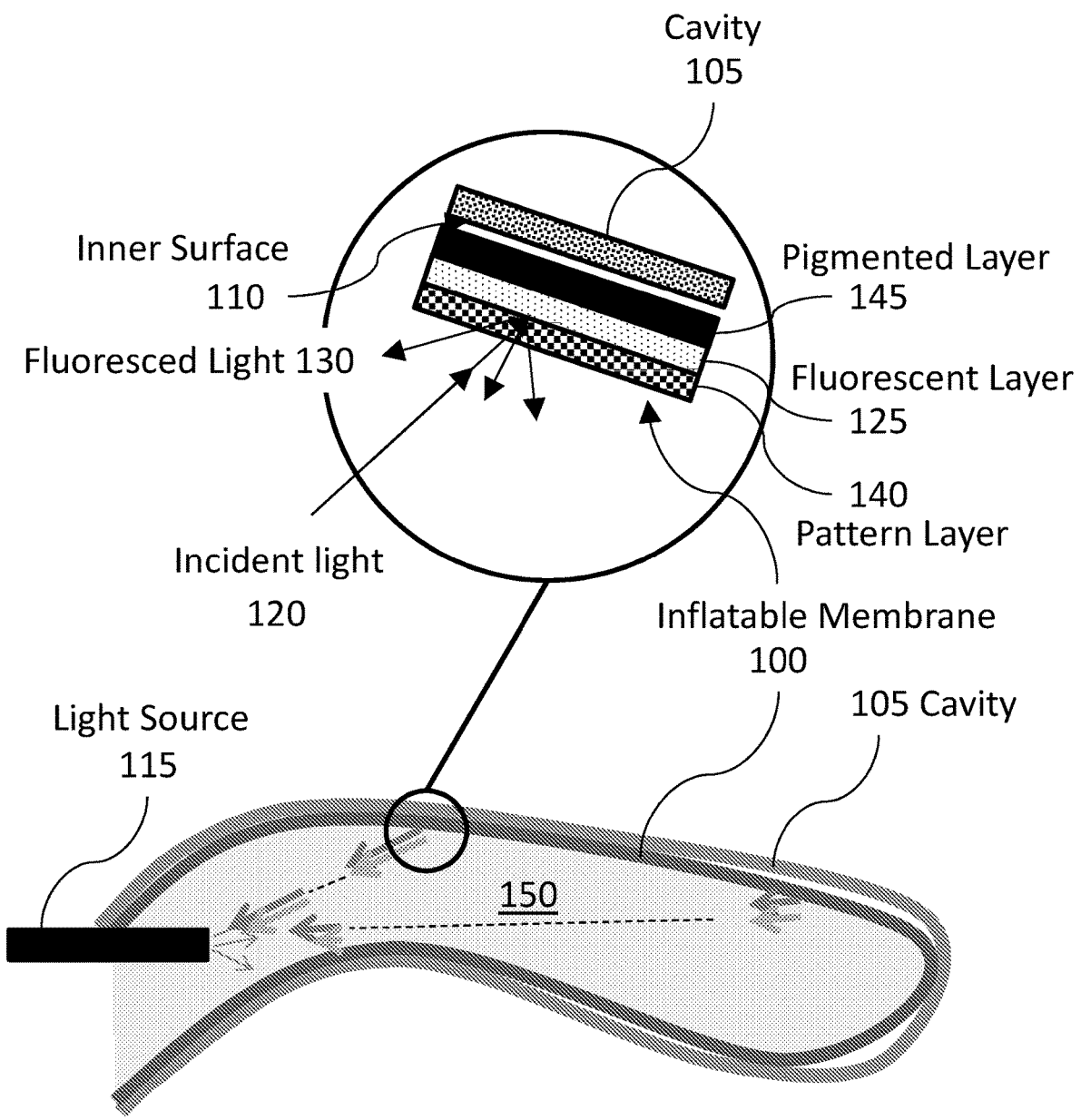
FIG. 1 is a diagram illustrating a simplified sectional view of an exemplary inflatable membrane, in accordance with certain aspects of the present disclosure.

FIG. 1 is a diagram illustrating a simplified sectional view of an exemplary inflatable membrane 100 in accordance with certain aspects of the present disclosure. As shown in the implementation of FIG. 1, the inflatable membrane 100 may fill a cavity 105 and closely conform to an inner surface 110 of the cavity. A light source 115 may be introduced into the cavity 105 to illuminate, with incident light 120, at least part of the inflatable membrane 100. The inflatable membrane 100 may include a fluorescing material which may generate fluoresced light 130. The fluoresced light 130 may be received by a detector (here shown integrated with the light source 115). When imaged through an optically tuned differentially absorbing medium, the received light can be analyzed to determine an interior shape of the inflatable membrane 100 and hence of the cavity 105.

FIG. 1 also includes an expanded view of a portion of the inflatable membrane 100. The expanded view illustrates incident light 120 reaching the inflatable membrane 100. In the example implementation of FIG. 1, the inflatable membrane 100 may be constructed of three layers of material, though any number or combination of layers may be implemented. One layer may be a fluorescing layer 125 of florescent material may that lie behind a pattern layer 140, although the pattern layer 125 may be located right behind the pattern layer 140 as well. The pattern layer 140 may include the pattern used to reconstruct the shape of the cavity 105. Because the pattern layer 140 may be between the fluorescing layer 125 and the detector, the fluoresced light 130 may be partially blocked by the material making the pattern. In another implementation, the material making the pattern may not fluoresce, creating a negative image corresponding to the pattern. Thus, the fluoresced light 130 may include information about the pattern that may be analyzed to determine the shape of the cavity 105. In some implementations, there may also be another pigmented layer 145 that may be generally opaque to the incident light 120 or the fluoresced light 130. The pigmented layer 145 may be applied to be between the fluorescing layer 125 and the cavity 105.

In some implementations, the inflatable membrane 100 contains a fluorescent material, such as a dye or pigment, which may return an image of fluoresced light 130 when illuminated with, for example, visible blue or UV (ultraviolet) light. The concentration of pigment may be configured to be high enough to provide adequate opacification but low enough to provide a soft enough material to allow for adequate conformance of small features in the cavity. In other implementations, the inflatable membrane 100 may contain a fluorescent dye that returns an image when illuminated with white light. Some implementations may include an inflatable membrane 100 that may contain a fluorescent dye that returns an image when illuminated with light that is not visible to the naked eye, that is to say light has a wavelength that is outside the range of about 390 to 700 nm. In implementations where the inflatable membrane 100 contains a fluorescent material that returns an image of fluoresced light when illuminated with visible blue light, the membrane may fluoresce red and green light. Alternatively, the inflatable membrane 100 may fluoresce in any combination of two or more wavelengths, or ranges of wavelengths, of light in response to illumination with blue or white light. In such implementations, there may be a wavelength, band of wavelengths, multiple wavelengths, or multiple bands of wavelengths of illuminating light, such that the spectrum of the fluoresced light emitted in response to the illuminating light may not change by more than about 0.5% over the length of the inflatable membrane 100. For example, if the inflatable membrane 100 fluoresces red and green light in response to illumination with visible blue light, the ratio of red to green fluoresced light may not vary by more than about 0.5% over the length of the membrane, more than 1.0%, or more than 2.0% over the length of the membrane.

The inflatable membrane 100 may be filled with a medium 150 to inflate the inflatable membrane 100. The medium 150 may, for example, be a liquid, a dissolved gas, a gel, a hydrogel, and/or any combination of the four. The medium 150 may include additives dissolved into, or suspended in, the medium 150 to provide optical properties that may be used with imaging techniques to measure the shape of the interior surface of the inflatable membrane 100. These properties may include, for example, selective absorption/attenuation where one or more wavelengths of light are absorbed more than one or more other wavelengths. To illustrate, medium 150 may include a colored dye, suspension, a luminescent substance, and/or a fluorescent substance (and/or any other material having selective attenuation properties). Moreover, the selective attenuation properties may allow a detector to receive the selectively attenuated light to determine the shape of, distance to, and/or other properties of the scanned interior surface of inflatable membrane 100. In implementations where the inflatable membrane 100 fluoresces red and green light, the medium 150 may be a red fluid that preferentially absorbs the green light. By measuring the amount of attenuation (which is a known function of path length between the emitting surface and the detector), the distance from the surface to the detector can be determined based on the ratio of intensities at two measured wavelengths (shown in FIG. 1 by the arrows having different length when reaching the light source/detector 115). The medium 150 may also contain a bio-neutralizing, anti-microbial, or anti-oxidizing agent to improve the shelf life of the medium 150 as well as a buffering agent to improve the stability of the medium 150.

Figure 2:
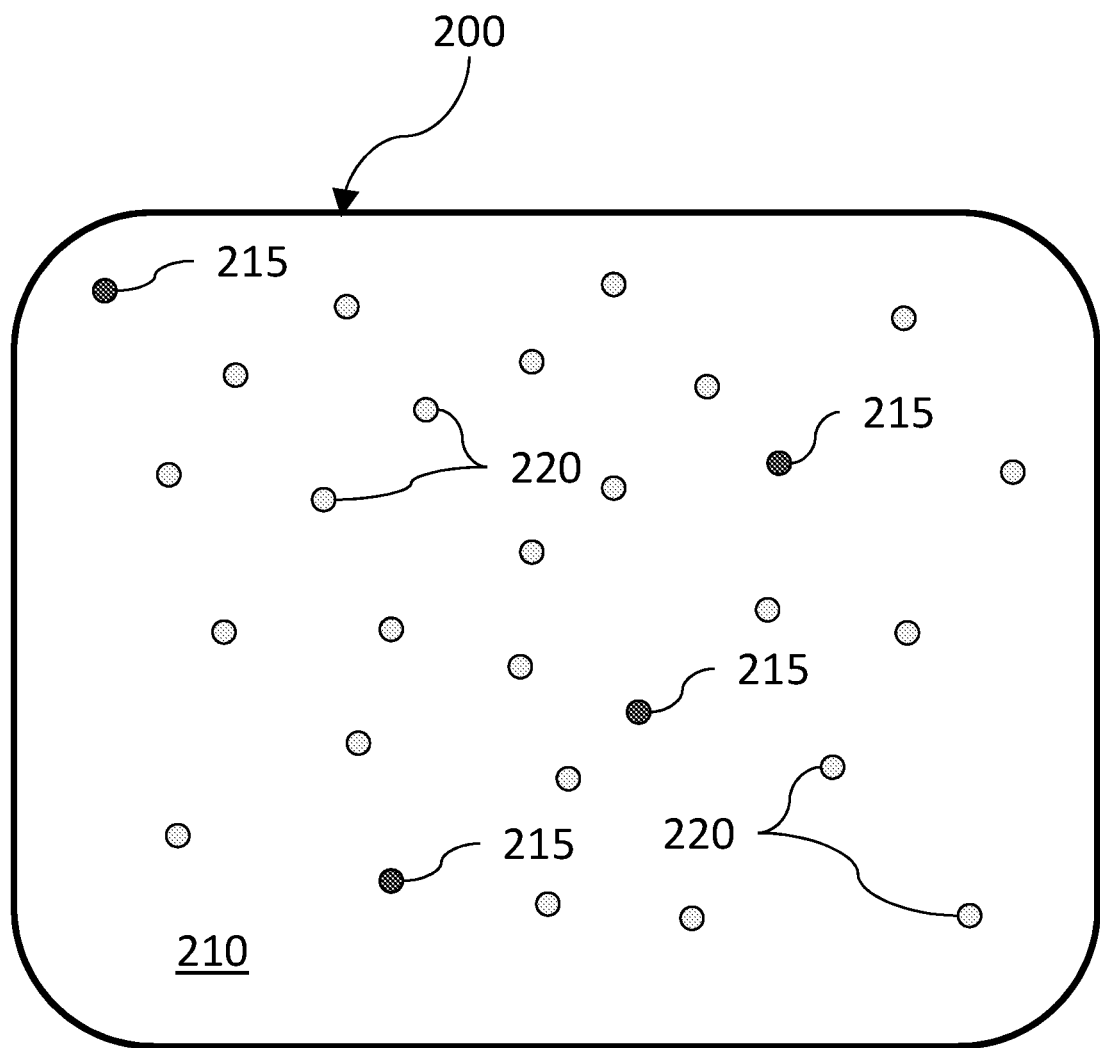
FIG. 2 is a simplified diagram illustrating a composite material having a matrix material, a pigment material, and a fluorescent material, in accordance with certain aspects of the present disclosure.

FIG. 2 is a simplified diagram illustrating a composite material 200 having a matrix material 210, a pigment material 215, and a fluorescent material 220, in accordance with certain aspects of the present disclosure. In some implementations, the inflatable membrane 100 may include one or more layers of material. Some implementations may have different types of material comingled in a layer to form a composite layer.

The inflatable membrane 100 may include, for example, the matrix material 210, the pigment material 215 for opacity, and the fluorescent material 220, such as a pigment or dye. The pigment material may also affect the mechanical properties, such as the stiffness of the membrane may be configured by adjusting the amount of pigment material. All of the materials may be selected to be biocompatible and to illicit as little reaction from the human body as possible. In some example implementations, this may be considered important because a goal of using the inflatable membrane 100 with a 3D scanning system is to improve comfort for the patient during fabrication of a 3D rendering or model of an anatomical cavity. The matrix material 210 may be a biocompatible or bio-inert polymer or mixture of polymers. The pigment material 215 for opacity may have little cytotoxic, sensitization, and/or irritation activity at the particle sizes and exposure levels that are possible when using the inflatable membrane 100.

The inflatable membrane 100 may comprise predominantly the matrix material 210. Correspondingly, the raw materials of the inflatable membrane 100 may comprise predominantly the matrix material 210 or its precursors, as well. The matrix material 210 may be combined as a liquid with the pigment material 215 for opacity and fluorescent dye during fabrication. Post-mixing curing, which can include casting, molding, heating, or the addition of further chemicals, may cause the matrix material 210 to transition from a pourable material, to a solid material with sufficient elasticity and toughness, as described above, to be useful in the scenarios described herein, such as multiple inflations at multiple degrees of inflation (e.g., multiple degrees of pressurization of the inflatable membrane 100).

In some implementations, the inflatable membrane 100 may have a composite layer including a matrix material 210 with pigment material 215 for opacity and particles of fluorescent material 220 which are not distinguishable to the naked eye as discrete particles when in the inflatable membrane 100. The inflatable membrane 100 has the pigment material 215 and fluorescent material 220 embedded in the bulk of the matrix material 210, on the surface of the inflatable membrane 100, or some combination thereof. For example, the pigment material 215 may be embedded within the matrix material 210 and the fluorescent material 220 may be on the surface of the inflatable membrane 100, or the fluorescent material 220 may be embedded in the matrix material 210 and the pigment material 215 may be on the surface of the inflatable membrane 100. Alternatively or additionally, the matrix material 210 may have both the pigment particles 215 and the fluorescent material 220 embedded in it and additional fluorescent material may be applied to the surface of the inflatable membrane 100, such as fiducials or other markers. The material properties of the inflatable membrane 100 may be attributable to the combination of the matrix material 210, the pigment material 215 and the fluorescent material 220.

The matrix material may include one or more polymer. The matrix material 210, for example, may be a low-hardness (e.g., a low-durometer) liquid silicone rubber, a liquid silicone elastomer, or a combination thereof. Exemplary silicones include silicones with the amount (e.g., mass) of silica used in production of the silicone reduced by a predetermined amount, such as 1%, 2%, 5%, 10%, 20%, and/or other amounts as well. In some implementations, more of one of the components of the matrix material 210 may be used to modify the cross-linking density of the matrix material 210, reducing the silica concentration. The matrix material 210 of the inflatable membrane 100 can also include silica enriched silicone, latex, polyurethane, polyisoprene, engineered thermoplastic polyurethane, thermoplastic polyethylene, plastisols, or any combination thereof. One or more thermoplastic elastomers may also be included in the matrix material 210. An example of a thermoplastic elastomer is MD-447, although other types of thermoplastic elastomers may be used as well.

The pigment material 215, for opacity, may include any suitable particulates, including suitable metals, metal oxides, metal carbides, and carbon blacks. In some implementations, the pigment material 215 may be a carbon black, such as a channel carbon black, a furnace carbon black, a lampblack, a thermal carbon black, an acetylene carbon black, or any combination thereof. The pigment material 215 may include primary particles, aggregates of primary particles, and agglomerates of primary particles. The primary particles can range in diameter from about 15 nm to about 20 nm. The aggregates can range in diameter from about 50 nm to about 400 nm. Agglomerates of the primary particles can range in diameter from the size of aggregates up to 2 mm. In some implementations, the primary particle size of the pigment material 215 can range from about 10 to 30 nm, the size of aggregates of primary particles of pigment material 215 can range from about 50 to 200 nm, and aggregates of pigment material 215 may be up to 2 mm in diameter. High-purity furnace carbon black can have total polycyclic aromatic hydrocarbons (PAHs) at a level not exceeding about 0.5 parts per million (ppm) and benzo[a]pyrene not exceeding about 5.0 parts per billion (ppb).

The fluorescent material 220 of the inflatable membrane 100 may be of a single type of fluorescent dye or a combination of fluorescent dyes. Any fluorescent material 220, such as dye or pigment, or combination of fluorescent material 220 with a large Stoke's shift and a broad emission spectrum with at least two bandwidths that are suitable to use as signal in the 3D scanning system can be used in the inflatable membrane 100 with the differentially absorbing medium 150. In some implementations, the fluorescent material 220 of an inflatable membrane 100 can be a fluorescent dye that has reduced or negligible reflectance at the wavelengths which a 3D scanning system uses as signal. In other implementations, the inflatable membrane 100 may contain a concentration of fluorescent material 220 high enough to obtain good signal, but low enough for any reflection from the fluorescent material to be ignored. For example, for a 3D scanning system that measures the relative intensities of red and green light, the ideal fluorescent material 220 may be a dye that absorbs at higher energy wavelengths, such as blue or UV; a dye that fluoresces light that includes red and green wavelengths; and a dye that is used at a concentration such that the dye reflects little to no red or green light. Such a dye may be considered transparent to the wavelengths of light selected by the system, or a user, as the signal wavelengths. In this case, a dye that is excited by blue light, fluoresces yellow light (that includes red and green light in its emission spectrum), and is transparent to red and green light is an ideal, invisible fluorescent dye. The dye is invisible in that it does not contribute substantially to the signal noise because it does not reflect, scatter, or otherwise perturb the fluoresced light at the wavelengths of interest, namely the red and green wavelengths. The dye may be invisible also if it is used at a concentration where any reflectance or scattering is negligible at the wavelengths of interest. This fluorescent dye may comprise a metal complex with a melting point of around 350-356° C., and may be excited by light with any light in a range from UV to blue, such as light with a wavelength of about 366 nm, and which has an emission spectra with a peak at a wavelength of 549 nm. The dye may be a yellow powder when not mixed with a matrix material 215 and has a particle size distribution, based upon the particle diameter, ranging from about 2.0 microns to about 20 microns. The particles used in any of the materials herein may be rod shaped (e.g., high aspect ratio particles) with a diameter of about 2 microns and a length of about 20 microns. An invisible, or transparent, fluorescent dye used as the fluorescent material 220 in an inflatable membrane 100 can be a metal complex, an organic molecule, or any other material with suitable excitation, emission (i.e., fluorescent), and reflective and scattering properties.

Figure 3:
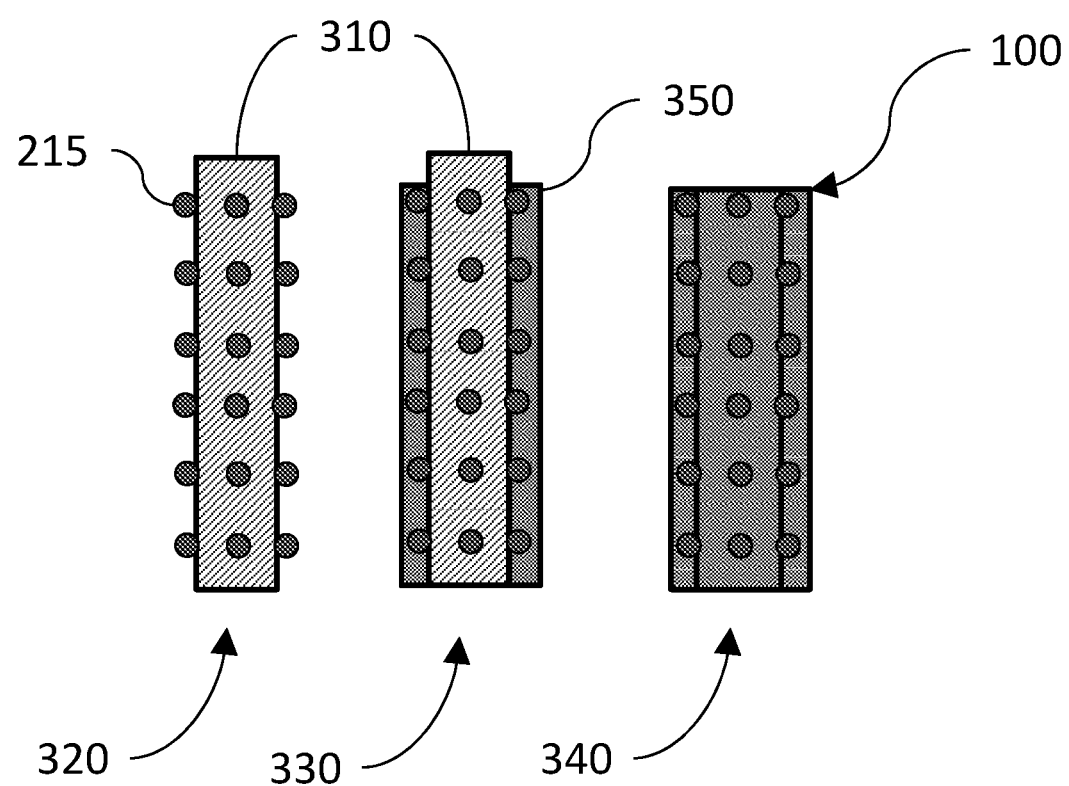
FIG. 3 is a diagram illustrating an exemplary process of forming the inflatable membrane around a casting plate, in accordance with certain aspects of the present disclosure.

FIG. 3 is a diagram illustrating an exemplary process of forming the inflatable membrane 100 around a casting plate 310, in accordance with certain aspects of the present disclosure. In an implementation, as shown at 320, a transferrable material may be applied to an outer surface of a casting plate 310 to form a pattern on the outer surface of the casting plate 310. The transferrable material may be transferred from the casting plate 310 to the inner surface of the inflatable membrane 100. The transferring mechanism may be similar to ink being transferred from one surface to another, a chemical bonding process such as an adhesion of some of the transferrable material to the inflatable membrane 100, or the like. The transferrable material may include the pigment material 215 or any other type of dye, ink, or other material to form the pattern.

Once transferred, the transferrable material may form a pattern on the inner surface of the inflatable membrane 100. The round and/or spherical character of the transferrable material and the specific pattern shown in FIG. 3 is merely an example or for illustrative purposes and not intended to be limiting. Other patterns may include, for example, grids, circles, geometric patterns (hexagonal, octagonal, etc.), variations in color, variations in intensity, or other types of spatially varying patterns.

The casting plate 310 may include, for example, a mandrel or other object that the inflatable membrane 100 may be formed around. In some implementations, the casting plate 310 (or mandrel) may have an outer shape that is generally elongate and may generally conform to a cavity corresponding to an interior of an ear. The degree of conformity can vary between, for example, a conical shape (as shown in FIG. 4, below), a cylindrical shape, or a shape that may generally conform to features of a typical person's inner ear.

After the pattern has been cured, a composite material 350 may be applied, at 320, to the outer surface of the casting plate 310, after the applying of the transferrable material, to form an inflatable membrane 100. The composite material 350 may cover at least a portion of the pattern and include the florescent material 220, the pigment material 215, or both. In other implementations, the composite material may include other materials.

At 330, the inflatable membrane 100 may be cured to allow removal of the inflatable membrane 100 from the casting plate 310. Once removed, the inflatable membrane 100 may include an inner surface having the pattern. As discussed above, the pattern may be detectable upon receiving light that causes the fluorescing material 220 to emit fluoresced light 130.

Figure 4:
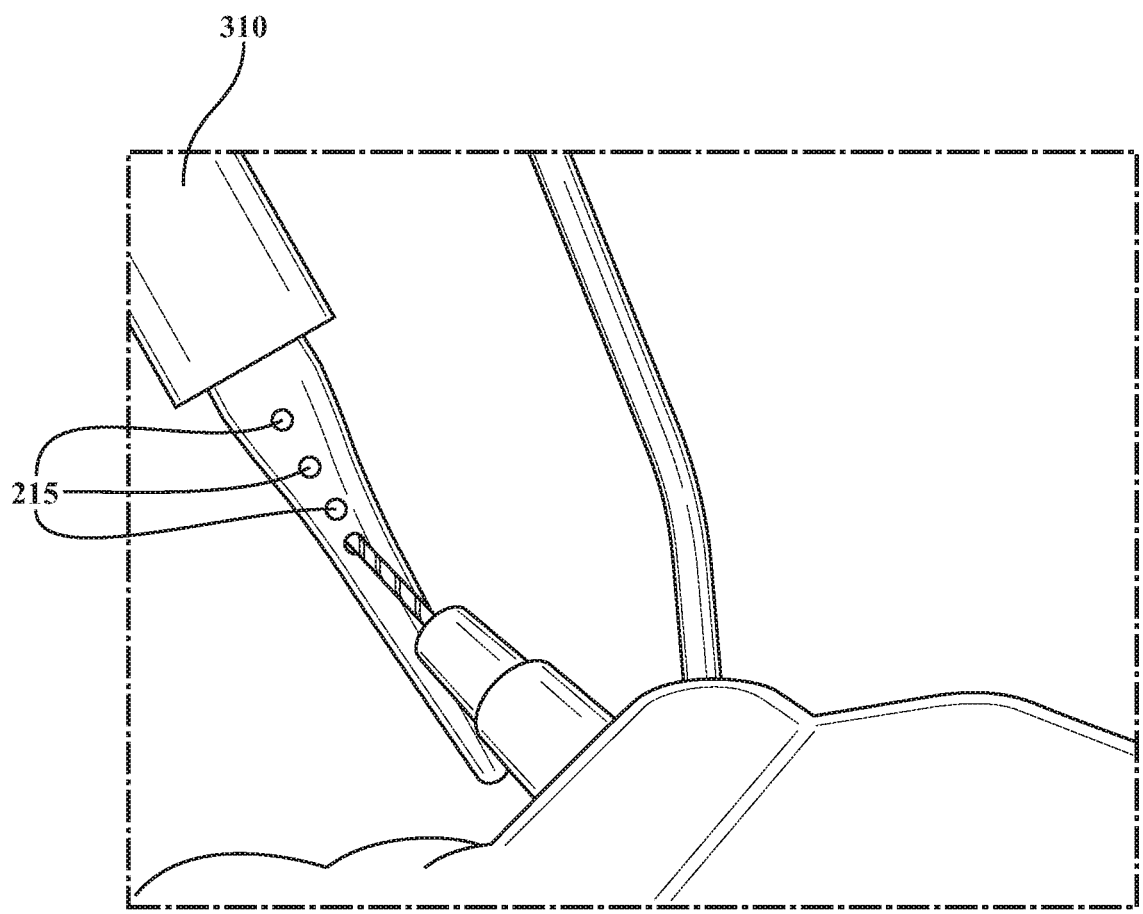
FIG. 4 illustrates applying a transferrable material to an outer surface of a casting plate to form a pattern, in accordance with certain aspects of the present disclosure.

FIG. 4 illustrates applying a transferrable material to an outer surface of a casting plate 310 to form a pattern, in accordance with certain aspects of the present disclosure. In some implementations, the transferrable material may be applied by at least one of a hypodermic needle, painting with a brush, spraying, printing from a laser jet printer, printing from a pad printer, etching, and dipping. FIG. 4 illustrates a hypodermic needle being used for this process.

Figure 5:
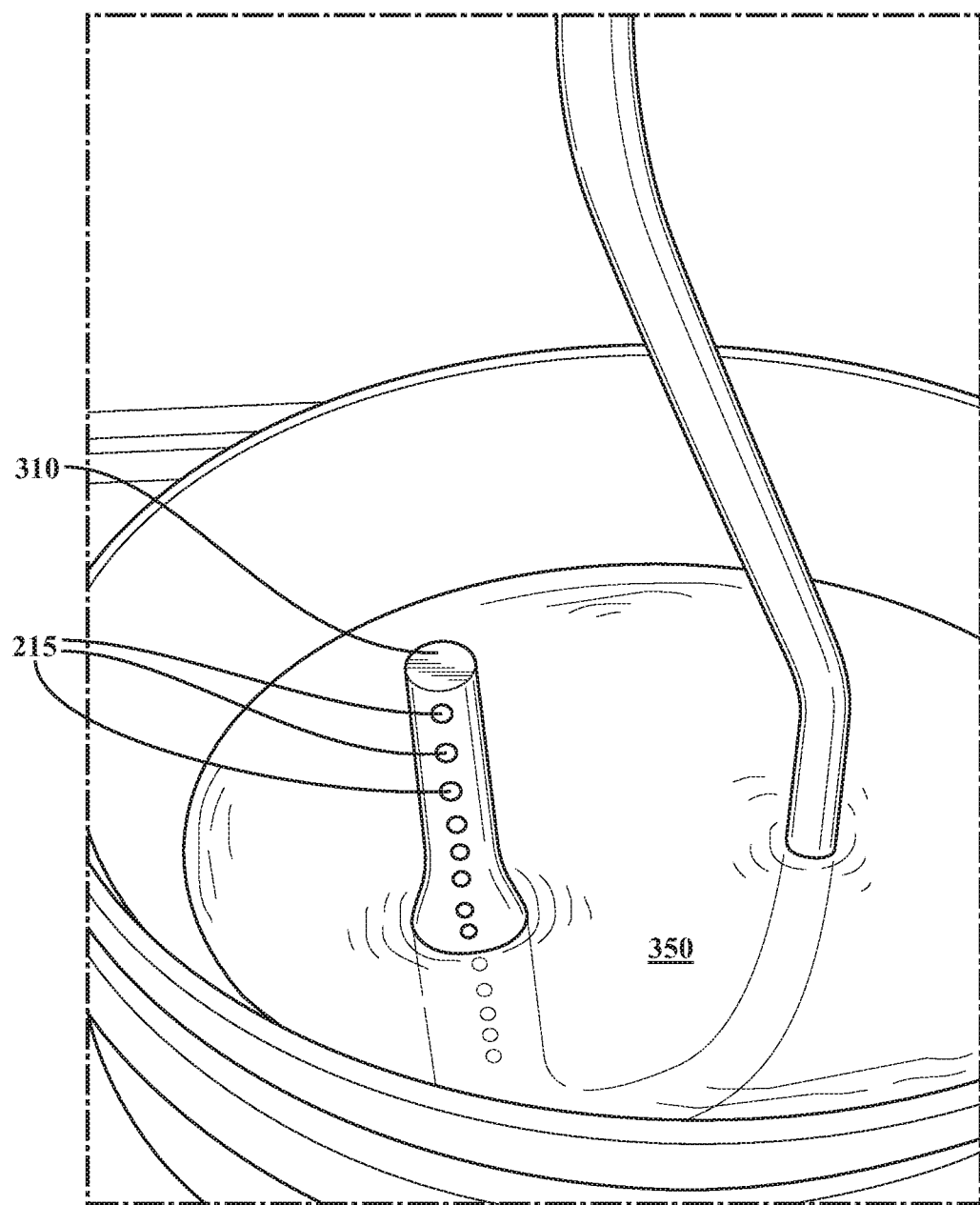
FIG. 5 illustrates applying a composite material to the outer surface of the casting plate after the applying of the transferrable material, in accordance with certain aspects of the present disclosure.

FIG. 5 illustrates applying a composite material 350 to the outer surface of the casting plate 310 after the applying of the transferrable material, in accordance with certain aspects of the present disclosure. The composite material 350 may be applied by dipping the casting plate 310 with the transferrable material into the composite material 350. Any of the composite material 350, matrix material 210, pigment material 215, and fluorescent material 220, may be contained in a dipping container or other material dispenser.

Figure 6:
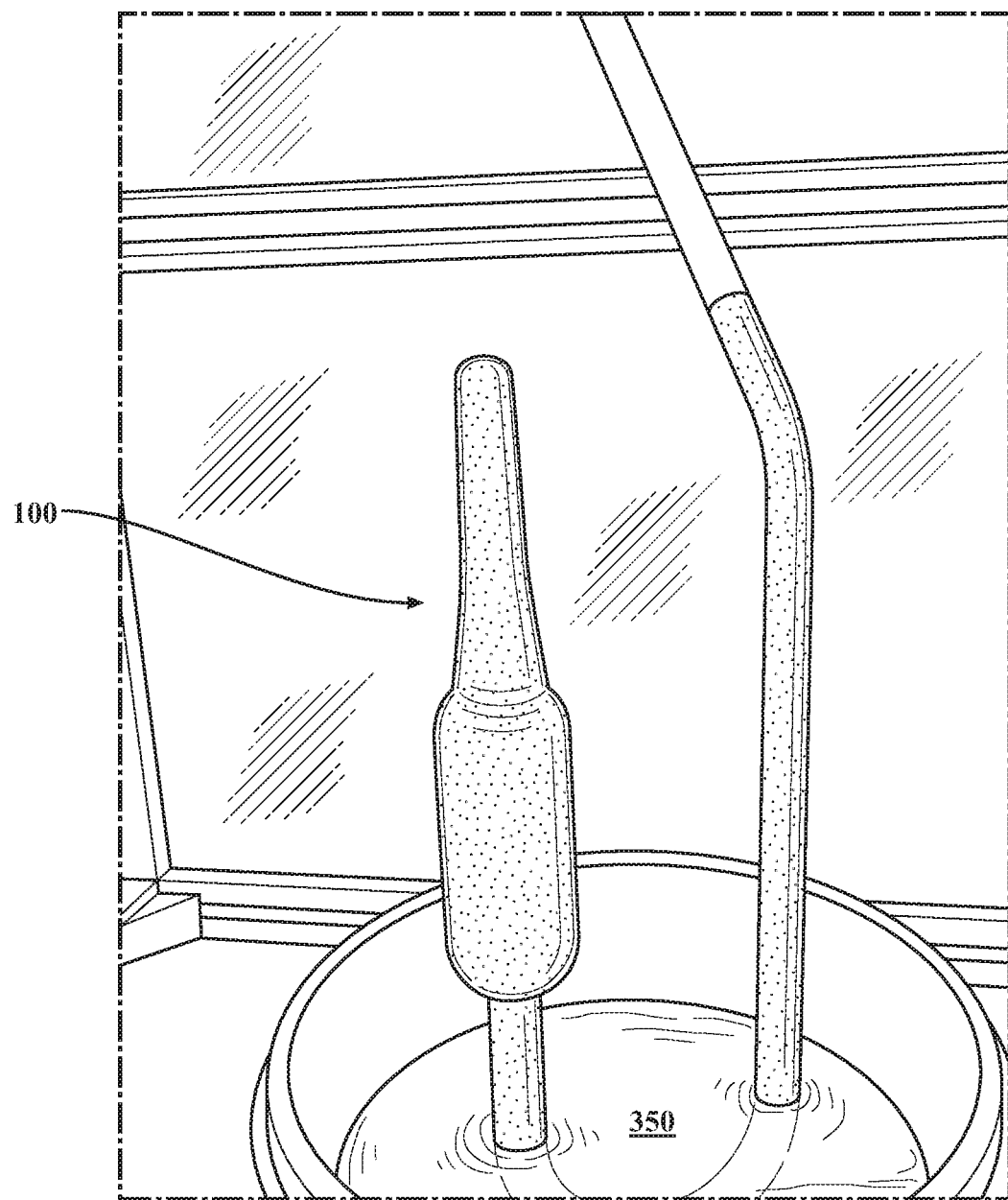
FIG. 6 illustrates forming of the inflatable membrane after removal from the composite material, in accordance with certain aspects of the present disclosure.

In some implementations, there may be a window on formed on an end of inflatable membrane 100. The window may be an aperture or may be another material, for example transparent plastic, that allows the transmission of light through a distal end of the inflatable membrane 100. In some implementations, the distal end may be the end of the inflatable membrane that is inserted furthest into the ear of a person. The window, or an aperture configured to accept a window, may be formed by not fully dipping or coating the casting plate 310 with the composite material 350. In this way, the aperture can be formed by selectively applying any of the layers to the outer surface of the casting plate 310, without applying any of the layers to the distal end of the casting plate. In other implementations, the window may be formed by removing material, for example by cutting, from the end of a fully coated casting plate 310 (as shown in FIG. 6). A transparent material, for example plastic or glass, can be applied to the distal end of the inflatable membrane 100 to span the aperture and form the window.

When inserting the inflatable membrane into a cavity (for example in an ear or other type of cavity), a user can insert the inflatable membrane 100 using the window as a guide to avoid unwanted contact with interior structures or surfaces in the cavity. A detector (which may be the same as the detector used to detect reflected or fluoresced light) can image the interior of the conforming membrane through the window while the inflatable membrane 100 is being inserted or otherwise used. In some implementations, the imaging may occur through the absorbing medium including inside the inflatable membrane.

FIG. 6 illustrates forming of the inflatable membrane 100 after removal from the composite material 350, in accordance with certain aspects of the present disclosure. After removal, the inflatable membrane 100 may be cured, for example by drying in air, with heat, with cooling, or the like. Once cured, the inflatable membrane 100 may be removed from the casting plate 310.

Figure 7:
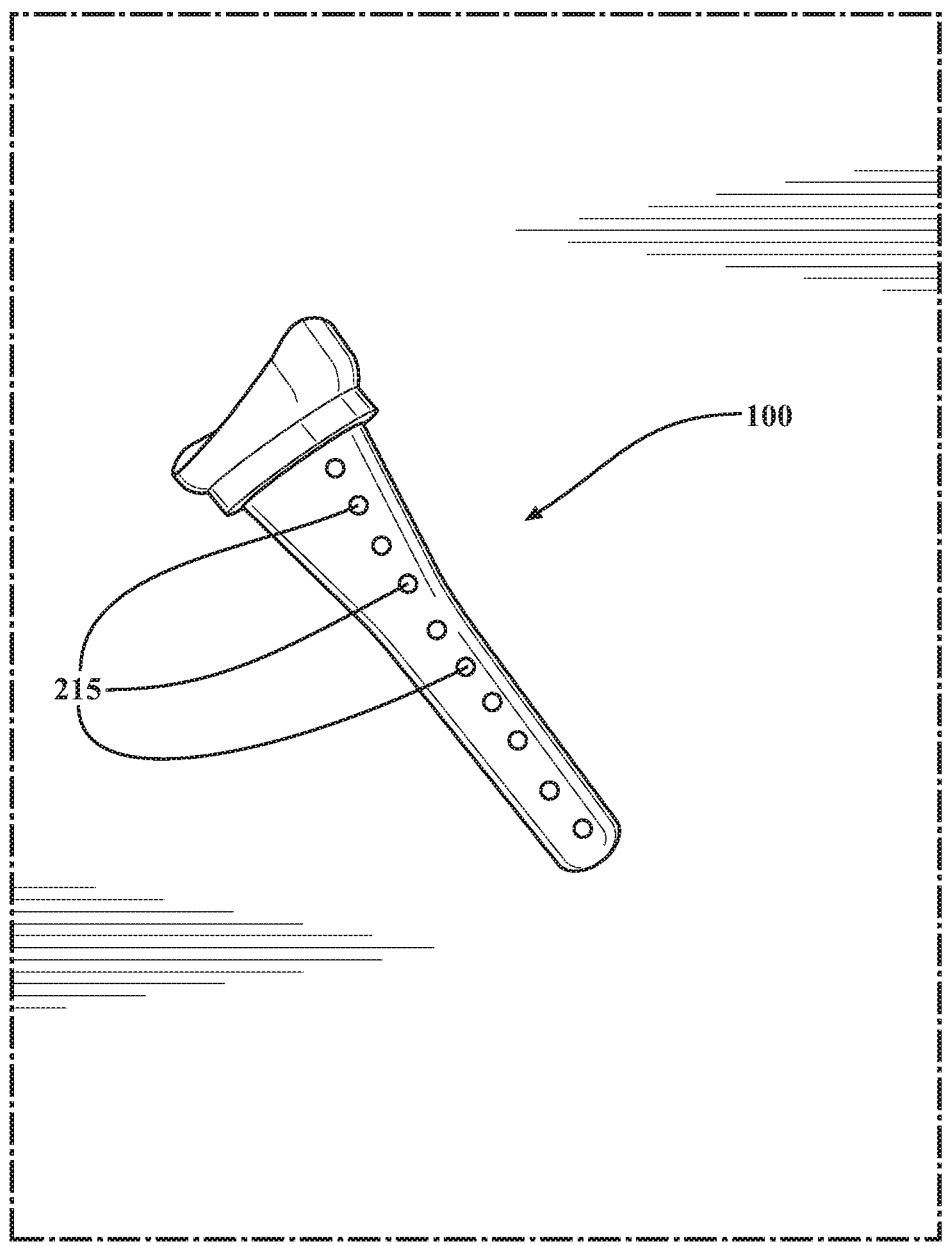
FIG. 7 illustrates an exemplary inflatable membrane after inversion, showing the pattern on the inner surface of the inflatable membrane, in accordance with certain aspects of the present disclosure.

FIG. 7 illustrates an exemplary inflatable membrane 100 after inversion, showing the pattern on the inner surface of the inflatable membrane 100, in accordance with certain aspects of the present disclosure. As shown in FIG. 7, under light that may cause the inflatable membrane 100 to fluoresce, the transferrable material (which is shown not fluorescing) may provide a measurable contrast that can be imaged by the detector. The images may be analyzed by an image analysis program to determine the interior shape of the cavity 105.

Figure 8:
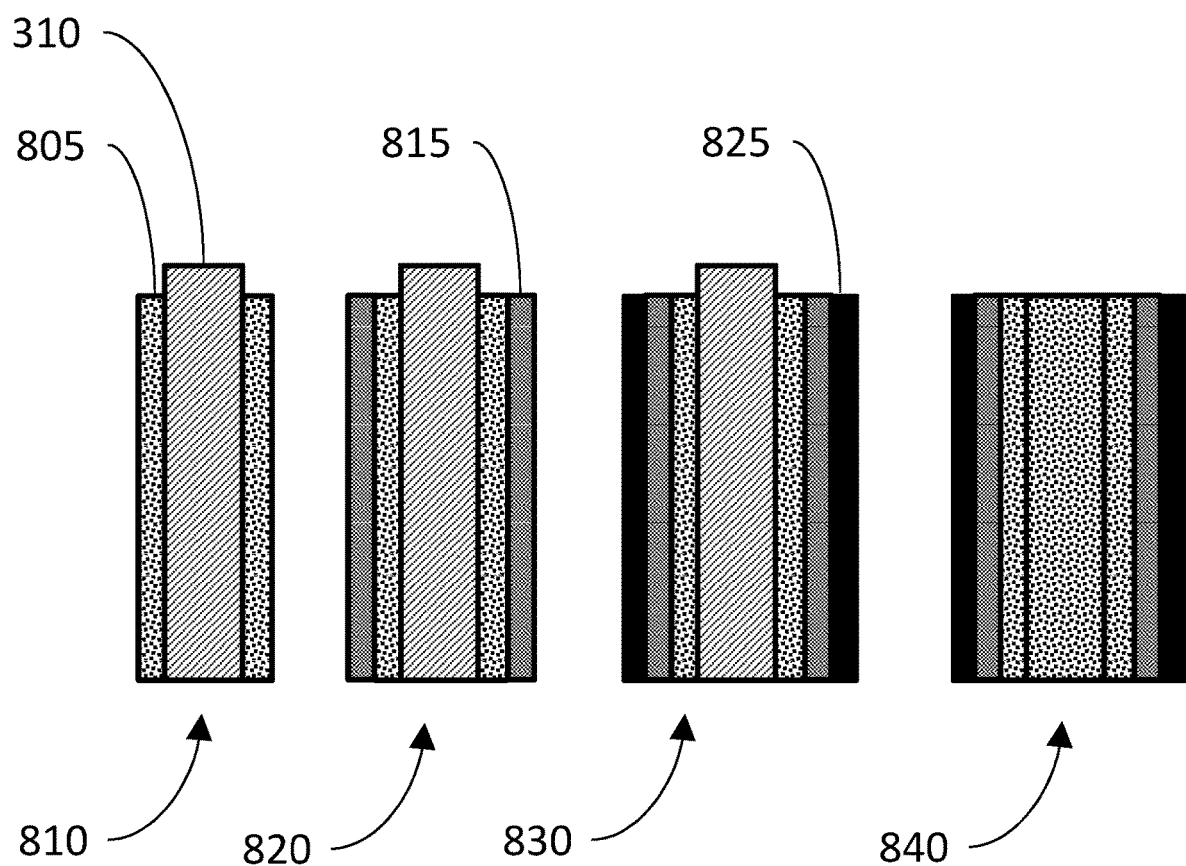
FIG. 8 is a diagram illustrating a second exemplary process of forming the inflatable membrane around the casting plate, in accordance with certain aspects of the present disclosure.

FIG. 8 is a diagram illustrating a second exemplary process of forming the inflatable membrane 100 around a casting plate 310, in accordance with certain aspects of the present disclosure.

At 810, a first layer 805 of a fiducial material may be applied to an outer surface of a casting plate 310. The fiducial material may include fiducial markers suspended in the fiducial material. Fiducial markers may be similar to the transferrable material in that because of the way they block light from the fluorescent material, the fiducial markers themselves may form a random pattern that can be imaged. The fiducial markers can include, for example, grains, shards, fragments, or other small objects (e.g., 50-400 microns, although other size may be used as well). In some example embodiments, if the fiducial marker particle size is below 50 microns, the markers may be too small to be resolved by some imaging systems and/or may not provide sufficient contrast for the imaging system to identify a pattern. And, if the fiducial marker particle size is above 400 microns, the markers may be too large and thus obscure the fluorescent signal behind the fiducial layer. Features of the suspended fiducial material may be interpreted as a random pattern by the detector. For example, the density, orientation, appearance, or the like, can define a random pattern. As one example, a fiducial material having fiducial markers at a uniform density throughout the fiducial material can conform to an unperturbed state of the inflatable membrane 100. Where, for example, the inflatable membrane 100 is stretched, the local area density of the fiducial markers may decrease, indicating a deformation of the inflatable membrane 100. Similar changes to the random pattern (whether from the fiducial markers or the transferrable material) can indicate compression or a particular local surface orientation of the inflatable membrane 100.

The inflatable membrane 100 can also include, at any of the layers described herein or formed by the fiducial material, a texture that can be imaged (via differential absorption as noted) to enable the identification of the shape of the inner surface of the inflatable membrane 100. As noted, the pattern may be used to enable combing, or stitching, adjacent surface patches of imaging. The texture can include, for example, groves, etched channels, or grooves filled with another material of a different color, fluorescent property, surface texture, or the like. The texture can be formed as a random pattern, a grid, a grid of varying shape, or the like to provide a surface with reference points that can be imaged by a detector to determine the contours or shape of the interior or exterior surface of the inflatable membrane 100.

At 820, a second layer 815 of a composite material 350 may be applied to the first layer to form an inflatable membrane 100. The composite material 350 may include a florescent material 220 and a pigment material 215.

In other implementations, at 830, a third layer 825 may be applied to the second layer 815. The third layer 825 may include the pigment material 215 and not include the fluorescent material 220. In some implementations, the third layer 825 includes only the pigment material 220. In other implementations, there may be other materials besides the pigment material 220, except for the fluorescent material 215.

At 840, the inflatable membrane 100 may be cured to allow removal of the inflatable membrane 100 from the casting plate 310. Here, the inflatable membrane 100 may include an inner surface having the fiducial markers detectable upon receiving of light causing the fluorescing material to emit florescent light.

Similar to the method shown in FIG. 5 and FIG. 6, the first layer 805, the second layer 815, or the third layer 825 may be applied by dipping the casting plate 310 into the fiducial material, the composite material, or the pigment material.

The combining and processing of the raw materials of the inflatable membrane 100 may correlate strongly to the physical and optical properties of the finished inflatable membrane 100 used in a 3D scanning system. Fabrication methods that can be used to make inflatable membranes are described below. Variation of the ratio of the constituent materials of the inflatable membrane 100 may cause variation in the performance of the inflatable membrane 100, and such variations in raw materials will be described first. Then, various ways of mixing the raw materials will be described.

The raw materials for fabricating an inflatable membrane 100 can include the matrix material 210, the pigment material 215, and the fluorescent material, as described above. The raw materials can be combined by weight in the following ratios, in which the first number in the ratio is the weight of the raw material (e.g., pigment material 215 or fluorescent material 220) and the second number is the weight of the matrix material 210 in the mixture. In some implementations, an inflatable membrane 100 can include about 1:400 by weight of pigment material 215 for opacity and about 1:50 by weight of fluorescent material 220. Alternatively or additionally, an inflatable membrane 100 may include pigment material 215 by weight in an amount ranging from about 1:350 to about 1:450 and fluorescent material 220 by weight in an amount ranging from about 1:100 to about 1:25.

In some implementations, a mixture called a masterbatch, that is used to fabricate an inflatable membrane 100, can be created. The masterbatch mixture can be a small volume of material, such as about 10 g, that includes, for example, about 0.09±0.01 g of pigment material 215, about 0.73±0.01 g of fluorescent dye, and about 9.17±0.02 g of matrix material. In other implementations, the masterbatch mixture can be a larger volume of material, such as about 240 g, that includes about 0.6±0.01 of pigment material 215, about 4.8±0.01 g fluorescent dye, and about 120.0±0.02 g matrix material 210.

With respect to the florescent material, if the concentration is too low, the intensity may not be bright enough to successfully image at a distance and make meaningful measurements. But if the concentration is too high, there may be reflections which can confound the measurements inside the membrane. With respect to the pigment material, if the concentration is too low, the membrane may not be opaque enough and ambient light from outside the membrane may introduce error into the measurements (which may reduce the overall signal to noise ratio). If however the concentration is too high, the material may be too stiff and may not conform to small features on the inner surface of the cavity (which may introduce error into the overall geometry computed by the scanning system).

In some such implementations, the matrix material 210 may be a two-part elastomer or polymer, and only one part may be added to the masterbatch. In other implementations, the matrix material 210 may not have more than one portion, and part of the mass of the matrix material 210 may be added to the masterbatch, and the rest of the matrix material 210 may be combined with the masterbatch following some processing.

Fabricating the masterbatch mixture can include some processing of the combined matrix material 210. Such processing may include mixing in speed mixer, milling in an attrition mill, ball milling, using media while milling, mixing, or centrifuging the mixture. The media may be ball milling media, such as ceramic or metal media. Ceramic media can include yttria stabilized zirconia pellets or balls, silica balls, alumina pellets or balls, or the like. Metal media can include stainless steel balls, aluminum balls, or metal balls of any metal or alloy that is corrosion resistant and wear resistant in the presence of the matrix material, pigment, and fluorescent material. Fabricating the masterbatch can also include allowing the mixture to rest, or reduce in temperature, after mixing to an elevated temperature. The rest time can vary, and can include a time of at least about 30 seconds, at least about 60 seconds, at least about 90 seconds, and at least about 120 seconds. During the rest time, the masterbatch mixture can be scraped down from the sides of the mixing container, as well as returning to ambient or near ambient temperature.

During fabrication of the masterbatch mixture, as well as the final mixture that is to become the inflatable membrane 100, a centrifuge set to various speeds of mixing can be used, with speeds ranging from about 1500 revolutions per minute (RPM) to about 3000 RPM, including from about 2000 RPM to about 2500 RPM. Also, various sizes of milling or mixing media can be used, of the material and shape described above, and the number of media can also be varied.

After the final mixture that is to become the inflatable membrane 100 is created, the mixture may be cured, molded, or dip-coated into sheets or other suitable shapes for the inflatable membrane 100. Curing the inflatable membrane 100 can include casting the membrane onto metal sheets, such as aluminum sheets, heating the cast material, or simply aging the material, such as by allowing it to sit, for an extended period of time.

In implementations involving dipping, solvents may be used dissolve the raw materials into solution. The amount and type of solvent may affect the viscosity of the solution. The viscosity of the solution coupled with the speed of insertion and removal from the dipping bath may determine the thickness of the dipped layer. Once dipped, the solvent may evaporate as the material cures.

Figure 9:
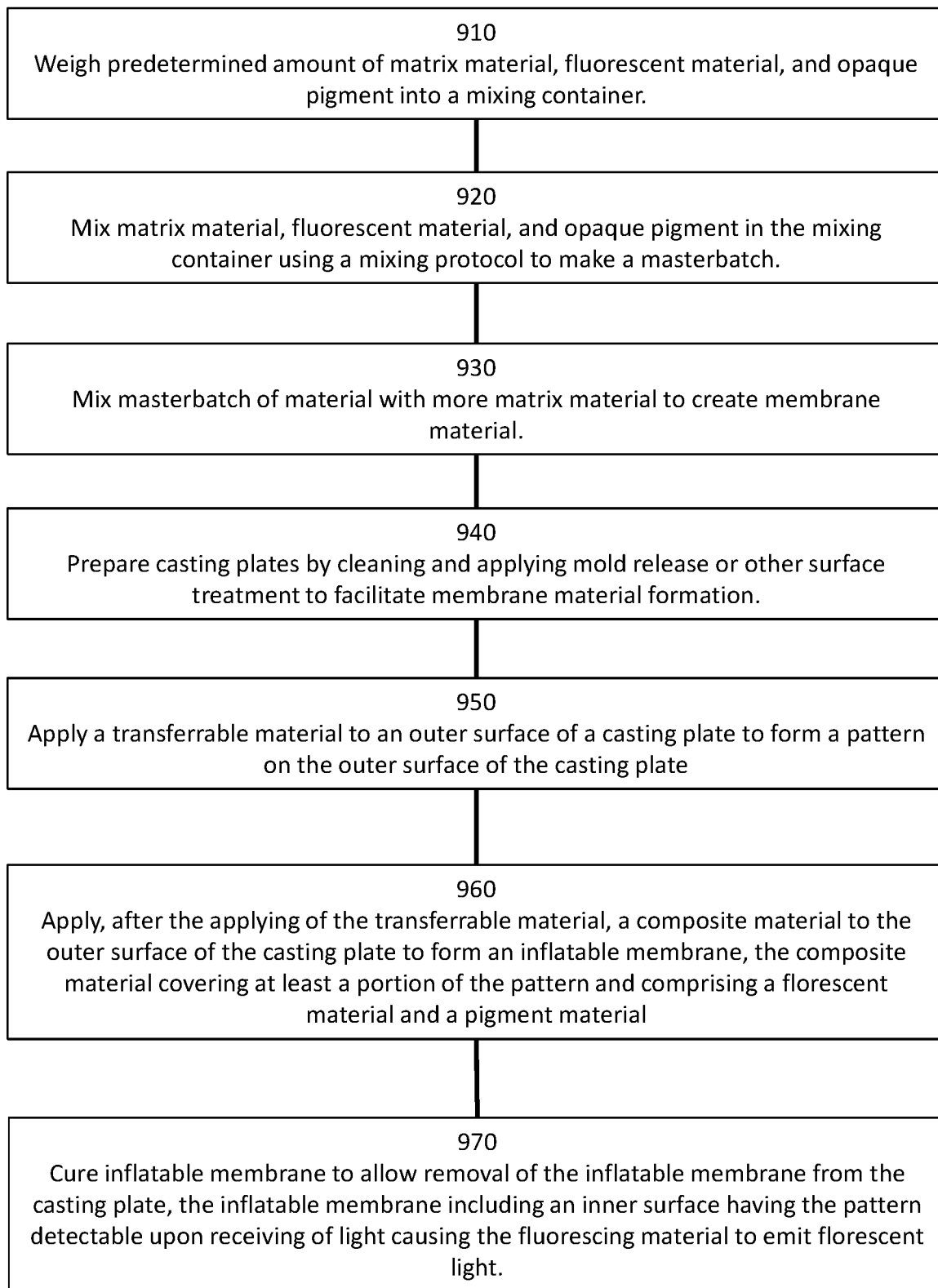
FIG. 9 illustrates a process flow diagram for a representative method of making inflatable membrane material, in accordance with certain aspects of the present disclosure.

FIG. 9 illustrates a process flow diagram for a representative method of making inflatable membrane material, in accordance with certain aspects of the present disclosure.

The first layer of material applied to the outer surface of the casting plate is a transferable layer. The transferable layer can be discrete, discontinuous or contiguous across the entire castable region of the outer surface of the casting plate. For example, the transferable layer may be a single region or marker that covers only a region of the outer surface of the casting plate. Alternatively or additionally, the transferable layer may be discontinuous so that it forms a pattern of some kind with multiple discrete points where the pattern covers some portion of the casting surface. Alternatively or additionally, the transferable layer may be contiguous so that it spans the entire castable area of the casting plate with no voids or gaps in coverage.

As the amount of the constituent materials may be important to the final materials characteristics, the first step may be to carefully weigh out predetermined amounts of the matrix material 210, pigment material 215, and fluorescent material 220 into a mixing container, as in 910. The material weighed out typically is for the creation of a masterbatch mixture, and it is mixed accordingly, 920. The mixing protocol for creating a masterbatch can include using a centrifuge, such as a dual asymmetric centrifuge, to initially spin the material in the mixing container for a predetermined time at a predetermined speed, such as for about 60 seconds at 2500 revolutions per minute (RPM). The protocol may then specify for the scraping of the material down from the sides of the mixing container and to add mixing or milling media, such as about ten ceramic cylinders (e.g., 10 millimeter cylinders), and then to spin the material in the mixing container for a predetermined time at a predetermined speed, such as for about 60 seconds at about 2100 RPM. After mixing, the masterbatch mixture may be allowed to rest, or cool, for a predetermined amount of time, such as two minutes. Then the sides of the mixing container may be scraped down before repeating of the spinning of the mixing container. The resting, scraping, and spinning may be repeated a set number of times for each process or until achieving a desired consistency. As needed, the protocol to produce a masterbatch mixture may be repeated to create a desired volume or mass of material for any number of inflatable membranes 100.

Once the masterbatch mixture is made, 920, more matrix material may be mixed with the masterbatch mixture to arrive at the final ratio of the constituent materials, 930. This may be about a 1:1 mixture of the masterbatch mixture and pure matrix material, or it can be a different ratio of masterbatch mixture to pure matrix material. In some implementations, the matrix material may have two components, one of which may be mixed with the masterbatch mixture, while the other component may be mixed in later to arrive at the final ratios of the constituents. In some implementations, the masterbatch and pure matrix material 210, or masterbatch and second component of the matrix material 210, may not be mixed until right before the membrane is ready to be formed. Alternatively, or additionally, the masterbatch and matrix material may be mixed using a mixing apparatus, such as centrifuge, as well as mixing or milling media to create a mixture that eventually becomes the inflatable membrane 100 material, as in box 930.

In some implementations, casting plates 310 may be used to form and cure the inflatable membrane 100. The casting plates 310 may be prepared, as in box 940. The casting plates 310 may be ceramic, metal, polymer or any suitable combination thereof, and preparation may include cleaning the plates with soap and water, with organic solvents, with mild acid, or a combination thereof. At 940, after cleaning, the casting plates 310 may be treated with a surface treatment, such as applying a mold release agent or other surface treatment to facilitate removal of the inflatable membrane from the casting plate 310. At 950, a transferrable material may be applied to an outer surface of a casting plate 310 to form a pattern on the outer surface of the casting plate 310. At 960, after the applying of the fiducial layer and allowing it to cure, a composite material may be applied to the outer surface of the casting plate 310 to form an inflatable membrane 100. The composite material may cover at least a portion of the pattern and comprising a florescent material and a pigment material. At 970, the inflatable membrane may be cured to allow removal of the inflatable membrane 100 from the casting plate 310. The inflatable membrane 100 may include an inner surface having the pattern detectable upon receiving of light causing the fluorescing material to emit florescent light.

Alternatively or additionally, the casting plates 310 may be attached to an apparatus that allows for the simultaneous application of the casting plates 310 and conveyance of the spreadable membrane material along a path. Such conveyance can also include the application of heat or other modifications to the environment, such as relative humidity, by a membrane curing or fabricating facility or system. The application of heat or adjustment of the environment may facilitate curing of the inflatable membrane 100. The cured membrane material may be removed from the casting plates 310, and the membrane material may be stored or sent to another facility for further processing. Further processing may include the application of more fluorescent material to create fiducial markings, cutting and joining the membrane material to create an inflatable membrane 100 sized appropriately for an intended use, assembly into a system, and the like. Although the previous examples referred to specific times, sizes, ratios, speeds (e.g., RPM), other values may be implemented as well.

Any of the features described herein, for example the process described above with regard to FIG. 9, may be performed under the control of, or assisted by, one or more computer processors.

Although a few embodiments have been described in detail above, other modifications are possible. For example, the method steps depicted in FIGS. 3, 8, 9, and described herein do not require the particular order shown, or sequential order, to achieve desirable results.

Figure 10:
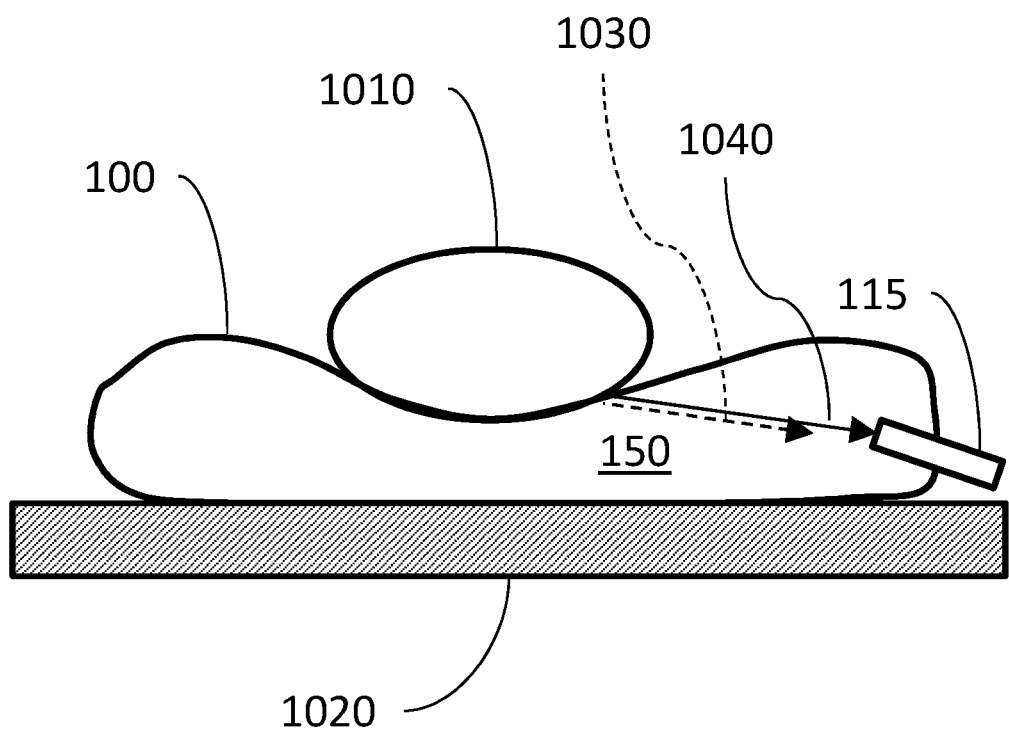
FIG. 10 illustrates a simplified diagram imaging the interior surface of the inflatable membrane through a media that differentially absorbs different wavelengths to determine the shape of an exterior surface of an object, in accordance with certain aspects of the present disclosure.

FIG. 10 illustrates a simplified diagram imaging the interior surface of the inflatable membrane 100 through a media that differentially absorbs different wavelengths to determine the shape of an exterior surface of an object 1010, in accordance with certain aspects of the present disclosure. In some implementations, the inflatable membrane 100 described herein can be used to also determine the surface shape or features of an object 1010 that is not a cavity. For example, as shown in FIG. 10, an object can be placed or otherwise brought into contact with the inflatable membrane 100, optionally resting on a surface 1020. This can cause the inflatable membrane 100 to conform to an exterior surface of the object, as opposed to an interior surface of a cavity. The light source 115 (which may also include a detector) may image reflected or fluoresced light from the interior surface of the inflatable membrane 100. The distorted surface of the inflatable membrane can then be analyzed to determine the exterior shape of the object 1010.

As described above with reference to FIG. 1, the inflatable membrane 100 can include a medium 150 that differentially attenuates light (from a light source 115 or from a fluorescent portion of the inflatable membrane 100). As the light attenuates there may be a first intensity of light 1030 that is strongly attenuated and a second intensity of light 1040 that is attenuated less than the first intensity of light 1030. The measured intensities may be compared to determine the shape of the interior surface of the inflatable membrane 115 and hence the shape of the exterior surface of the object 1010.

Applications of this implementation can include measuring the surface features of the external ear features or other facial features, a hand pressing on the inflatable membrane 100, a foot standing on the inflatable membrane 100, or the like. The object 1010 can also include any sort inanimate object that is positioned to deform the inflatable membrane 100 as described herein. As in other implementations, the inflatable membrane 100 can be filled with a fluid to provide a desired pressure or to facilitate transmission of light to the detector for imaging. Additionally, the external surface being scanned could exist in an environment where a vacuum or otherwise reduced pressure could be applied to create an increased pressure differential across the surface of the inflatable membrane 100 improving conformance of the inflatable membrane 100 to the higher resolution features on the surface being inspected or analyzed.

To provide for interaction with a user, one or more aspects or features of the subject matter described herein (for example, to mix or control a process as described above with regard to FIG. 9, as well as other aspects disclosed herein) can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

What is claimed is:

1. A method comprising:
   applying a first layer of a fiducial material to an outer surface of a casting plate, the fiducial material comprising one or more fiducial markers suspended in the fiducial material;
   applying a second layer of a composite material to the first layer to form an inflatable membrane, the composite material comprising a fluorescent material and a pigment material; and
   curing the inflatable membrane to allow removal of the inflatable membrane from the casting plate, the inflatable membrane comprising an inner surface having the one or more fiducial markers detectable upon receiving of light causing the fluorescent material to emit fluorescent light.

2. The method of claim 1, wherein the one or more fiducial markers have a particle size of 50 microns to 400 microns.

3. The method of claim 1, wherein the first layer is a clear layer without pigment material and the fluorescent material, wherein the second layer comprises the fluorescent material but not the pigment material.

4. The method of claim 1, further comprising applying a third layer, wherein the third layer comprises the pigment material but not the fluorescent material.

5. The method of claim 4, wherein the pigment material is selected to vary one or more of an optical and a mechanical property of the inflatable membrane.

6. The method of claim 4, wherein the first layer, the second layer, and the third layer are applied by dipping the casting plate into the fiducial material, the composite material, or the pigment material.

7. The method of claim 1, further comprising:
   forming an aperture in a distal end of the inflatable membrane; and
   applying a transparent material spanning the aperture to form a window in the distal end of the inflatable membrane.

8. The method of claim 7, wherein forming comprises:
   selectively applying the first layer and the second layer to the outer surface of the casting plate, without applying the first layer and the second layer to the distal end of the casting plate, to form the aperture in the distal end.

* * * * *